US011241018B2

(12) United States Patent
Chen et al.

(10) Patent No.: US 11,241,018 B2
(45) Date of Patent: Feb. 8, 2022

(54) PROCESS FOR PREPARING OLIGO-SACCHARIDE ENHANCED MILK PRODUCTS

(71) Applicant: A.G.V. PRODUCTS CORP., Chiayi (TW)

(72) Inventors: Kwan-Han Chen, Chiayi (TW); Hung-Chi Hsaio, Chiayi (TW); Hui-Min Lai, Chiayi (TW); Chien-Yu Chen, Chiayi (TW); Chia-Ching Li, Chiayi (TW); Yi-Shian Wang, Chiayi (TW); Ming-Chi Tsai, Chiayi (TW)

(73) Assignee: A.G.V. PRODUCTS CORP., Chiayi (TW)

( * ) Notice: Subject to any disclaimer, the term of this patent is extended or adjusted under 35 U.S.C. 154(b) by 86 days.

(21) Appl. No.: 16/140,735

(22) Filed: Sep. 25, 2018

(65) Prior Publication Data

US 2019/0090500 A1 Mar. 28, 2019

(30) Foreign Application Priority Data

Sep. 25, 2017 (TW) .................................. 106132841

(51) Int. Cl.
*A23C 9/20* (2006.01)
*A23C 9/12* (2006.01)
*A23C 9/13* (2006.01)
*A23C 3/033* (2006.01)

(52) U.S. Cl.
CPC .............. *A23C 9/203* (2013.01); *A23C 3/033* (2013.01); *A23C 9/1206* (2013.01); *A23C 9/1216* (2013.01); *A23C 9/1307* (2013.01); *A23V 2002/00* (2013.01); *A23V 2200/3204* (2013.01); *A23V 2200/324* (2013.01); *A23V 2200/3262* (2013.01); *C12Y 302/0102* (2013.01); *C12Y 302/01108* (2013.01)

(58) Field of Classification Search
CPC ....... A23C 9/203; A23C 3/033; A23C 9/1206; A23C 9/1216; A23C 9/1307; A23V 2002/00; A23V 2200/3204; A23V 2200/324; A23V 2200/3262; C12Y 302/0102; C12Y 302/01108
USPC ........................................ 426/34, 42, 43, 580
See application file for complete search history.

(56) References Cited

U.S. PATENT DOCUMENTS

| 4,853,246 A * | 8/1989 | Stevens ................... A23C 3/033 426/580 |
| 5,032,509 A | 7/1991 | Matsumoto et al. |
| 5,378,833 A | 1/1995 | Katta et al. |
| 9,636,367 B2 * | 5/2017 | Garcia-Rodenas ... A23L 33/135 |
| 2006/0115467 A1 * | 6/2006 | Pangborn ........ C12Y 204/01024 424/94.2 |
| 2008/0112944 A1 * | 5/2008 | Pangborn ........... A61K 38/4873 424/94.2 |
| 2012/0040051 A1 * | 2/2012 | Chen .................... A23C 9/1209 426/41 |

FOREIGN PATENT DOCUMENTS

| CN | 1903052 | 1/2007 |
| CN | 101095433 | 1/2008 |
| CN | 101199300 | 6/2008 |
| CN | 101263841 | 9/2008 |
| CN | 101396048 | 4/2009 |
| CN | 101700072 | 5/2010 |
| CN | 102369998 | 3/2012 |
| CN | 102475143 | 5/2012 |
| CN | 102613297 | 8/2012 |
| CN | 102715236 | 10/2012 |
| CN | 101991163 | 11/2013 |
| CN | 103859042 | 8/2015 |
| TW | I346698 | 8/2011 |
| TW | I527522 | 4/2016 |
| TW | I554214 | 10/2016 |

OTHER PUBLICATIONS

Koikeda, S., New concept of prebiotics: Prebiotic enzyme transglucosidase, J Biotechnol Biomater 2015, 5:2.*
Sako et al, Supplementing transglucosidase with a high-fiber diet for prevention of postprandial hyperglycemia in streptozotocin-induced diabetic dogs, Vet Res Commun (2010) 34:161-172.*
CN 101095433A translation, no date.*
CN 101199300 translation, no date.*
Office Action issued in TW 106132841, dated Sep. 25, 2018, 7 pages (translation).

* cited by examiner

*Primary Examiner* — Leslie A Wong
(74) *Attorney, Agent, or Firm* — Kilpatrick Townsend & Stockton LLP

(57) ABSTRACT

The subject invention aims to solve the problem of production of glucose accompanying the production of galactooligosaccharides after milk raw material is treated with lactase, by additionally adding transglucosidase to convert glucose to functional isomalto-oligosaccharide. The subject invention relates to a process for the production of a milk product enhanced with oligo-saccharides, characterized in that lactase and transglucosidase are used to treat milk raw materials. The subject invention further relates to the milk product of the process of the invention, whose oligo-saccharide content reaches a functional level. Human physiological effect assays confirm that the milk product increases intestinal probiotics, reduces harmful intestinal bacteria, improves the intestinal bacterial flora, reduces blood total cholesterol, reduces blood LDL cholesterol, increases blood HDL cholesterol, and improves the immunity, and may be used as low glycemic index (GI) dietary supplements.

6 Claims, 1 Drawing Sheet

PROCESS FOR PREPARING OLIGO-SACCHARIDE ENHANCED MILK PRODUCTS

FIELD OF THE INVENTION

The present invention relates to a process for the production of a milk product enhanced with oligo-saccharide. Specifically, the present invention relates to a process for the production of a milk product enhanced with galactooligo-saccharide and isomalto-oligosaccharide, comprising treating milk raw materials with lactase and transglucosidase. The present invention further relates to the milk product produced according to the process of the invention.

BACKGROUND OF THE INVENTION

The milk of mammals is highly nutritious. The ingredients in milk include important nutrients such as proteins, lipids, amino acids, minerals and vitamins. Many medical and nutritional studies have shown that drinking milk frequently can prevent loss of bone mass. The sugar in milk is lactose, which is a unique disaccharide found in milk. If a human body cannot secrete a sufficient amount of lactase to digest lactose, bacteria in the intestinal tract will ferment the lactose into lactic acid, carbon dioxide and other organic acids, resulting in an imbalance of osmotic pressure in the intestinal tract. Lactose intolerance will thus be induced, causing the symptoms of diarrhea, abdominal pain and abdominal distension.

Galactooligosaccharide (GOS) is a natural functional oligosaccharide. The molecular structure is generally 1 to 7 units of galactose linked to a galactose or glucose molecule, i.e., Gal-(Gal)n-Glc/Gal (n is 0-6). In nature, a trace amount of GOS is present in the milk of animals, with the amount of GOS being even higher in human milk. The proliferation of *Bifidobacterium* flora in infants mainly relies on the GOS ingredient in breast milk. Galactooligosaccharide is known to be capable of lowering the intestinal pH value, promoting enterogastric peristalsis, inhibiting the proliferation of harmful bacteria, and reducing the toxic waste generated from the metabolism of harmful bacteria, and thus is useful in elimination of toxic substances in vivo and in activating the functions of the human body. Therefore, GOS is one of the important functional ingredients in human milk and cow milk.

U.S. Pat. No. 5,032,509 discloses a method for preparing galactooligosaccharide, the method comprising treating lactose with β-galactosidase to obtain galactooligosaccharide and some fructose followed by treatment with glucose isomerase to obtain monosaccharide. Galactooligosaccharide or monosaccharide obtained by the method can be used as a sweetener or food supplement.

U.S. Pat. No. 5,378,833 discloses a method for preparing galactooligosaccharide as well, the method comprising heat-treating lactose or a mixture of lactose and galactose in an anhydrous powder condition in the presence of an inorganic acid at a high temperature of 100 to 200° C. for 0.5 to 3 hours. A galactooligosaccharide conversion rate of more than 80% can be achieved. The powder obtained through the method can be neutralized, decolorized, desalted and finally spray-dried to obtain powder products.

Taiwan Patent No. 1346698 discloses a method for preparing a milk product of low lactose and low glucose, comprising treatment with lactase or a lactose-fermenting yeast. The fermentation step is carried out at a temperature of 15 to 35° C. for 10 to 48 hours. The lactose content is reduced to be less than 50% of that in the initial material, and the glucose content is reduced to be less than 50% of that in the initial material. The obtained milk product has a yeast aroma. Flavoring agents can be added to mask the undesired flavor until an optimal flavor has been achieved.

China Patent No. CN 1903052 discloses a method for preparing whey powder having casein phosphopeptides, anti-angiotensin converzyme peptides and galactooligosaccharides, comprising fermenting the raw material of animal milk with lactic acid bacteria, adding rennin during fermentation to form curd, collecting the expelled whey, concentrating the whey to obtain a concentrated whey liquid having a protein content of 75 to 90%, and spray drying the liquid to obtain a whey powder product having casein phosphopeptides, anti-angiotensin converzyme peptides and galactooligosaccharides. The product has not only the functions of conventional whey powder but also the efficacies in promoting calcium absorption, ameliorating hypertension, and improving functions of the intestinal tract.

China Patent No. CN 101700072 discloses a method for preparing a low-lactose milk beverage, comprising hydrolyzing the lactose in the milk raw material into glucose and galactose with lactase, and hydrolyzing the proteins in the milk raw material into peptides with a mixture of proteases composed of *Lactobacillus helveticus* cell wall protease and chymotrypsin. The low-lactose milk beverage prepared by the method contains more peptides, and thus has better anti-oxidative and anti-fatigue efficacies.

China Patent No. CN 102613297 discloses aqueous milk for improving the immunity of a subject and method for preparing the same, comprising adding to the milk long- and short-chain composite prebiotics and organic selenium in a proper ratio. Through the synergistic activities of these substances, the growth and proliferation of probiotics in the intestinal tract can be promoted, and the immunity of the subject can also be increased. The method for preparing the milk product can be conducted by routine methods in the pertinent art. Since no special requirement is needed for the production equipment, the method can be directly applied for production.

The aforementioned methods for preparing galactooligosaccharide all pertain to chemical synthetic methods, or direct addition of galactooligosaccharide to improve effects or modify flavors. Further, some of the aforementioned methods are cumbersome and the periods of treatment with yeasts, proteases and enzymes are long, which results in higher production costs. A non-chemical synthetic method for producing oligosaccharides is urgently needed in the technical field of the present invention.

Isomalto-oligosaccharide (IMO), after ingestion, can be absorbed and utilized by the probiotics such as *Bifidobacterium* and lactic acid bacteria in the colon for their proliferation and metabolized to produce lactic acid and acetic acid, which reduce the pH value of the intestinal tract, improve enterogastric peristalsis and inhibit the proliferation of harmful bacteria.

China Patent Nos. CN 103859042 B and CN 102715236 disclose a prebiotic milk product and a method of preparation thereof. The patents disclose functional milk, said milk being prepared from liquid milk, Nestle anhydrous milk fat, milk flavor, yeast β-glucan, stabilizer, and prebiotics, and wherein said prebiotics are composed of fructooligosaccharides and isomalto-oligosaccharides. The invention selectively adds yeast β-glucan and two prebiotics in the milk product to obtain a health-care functional milk product. The health-care functional milk product is absorbed by a human body to optimize the intestinal environment of the human body, relax the bowels, achieve the effects of reducing blood lipids and blood glucose and promoting absorption of mineral elements, and improve human immunity such as tumor resistance, virus resistance, oxidation resistance, radiation resistance, blood glucose reduction and blood lipid reduction.

China Patent Application No. CN 102475143 A discloses a health-care milk product added with isomalto-oligosaccharide and polydextrose. The product of the invention of CN 102475143 A can strengthen the propagation of probiotics, enhance intestinal microecology, and help in eliminating constipation, improving body immunity, preventing and inhibiting hyperlipidemia, as well as promoting the digestion and absorption of various nutritional components in existing milk products.

China Patent Application No. CN 101263841 A discloses a functional health-care milk product, characterized in that functional oligosaccharides, including oligomannose, xylooligosaccharide, fructooligosaccharide, galactooligosaccharide, stachyose, raffinose, isomalto-oligosaccharide, malto-oligosaccharide and soybean oligosaccharide, are added. The final product may be in the form of milk powders, liquid milk or milk tablets. The product of the invention has the efficacies of promoting the proliferation of probiotics and modulating the microorganisms in the intestinal tract, and thus can facilitate the elimination of functional constipation, increase the immunity of the subject, prevent and inhibit hyperlipidemia, and promote the digestion and absorption of various nutritional ingredients in existing milk products.

None of the prior references discloses a method of simultaneously increasing the contents of galactooligosaccharide and isomalto-oligosaccharide in a milk product.

Further, none of the prior art references discloses a method of increasing the content of oligosaccharides in a milk product while simultaneously enhancing the function of said milk product; for example, simultaneously increasing the content of galactooligosaccharide in a milk product and reducing the content of lactose so as to avoid lactose intolerance; increasing the content of isomalto-oligosaccharide and reducing the content of glucose such that the milk product thus prepared is a low glycemic index (GI) food; modulating blood lipids; improving intestinal function; increasing immunity; and/or elevating lactoprotein.

SUMMARY OF THE INVENTION

A purpose of the present invention is to provide a method of preparing a milk product enriched with oligosaccharides, comprising treating milk raw materials with lactase and transglucosidase.

A further purpose of the present invention is to provide a method of preparing a milk product enriched with galactooligosaccharide and isomalto-oligosaccharide, comprising treating milk raw materials with lactase and transglucosidase.

Another purpose of the present invention is to provide a milk product enriched with oligosaccharides, wherein the milk product is prepared by the above methods, wherein the oligosaccharides include galactooligosaccharide and isomalto-oligosaccharide, and the milk product optionally is further enriched with lactoprotein.

A still further purpose of the present invention is to provide a use of a milk product of the present invention enriched with oligosaccharides, in the manufacture of food supplement for modulating blood lipids, improving intestinal function and/or increasing immunity.

Another still further purpose of the present invention is to provide a use of a milk product of the present invention enriched with oligosaccharides, in the manufacture of the base for ice cream, yogurt, milkshakes, health drinks, flavored milk, snack foods or the low GI food formula of special nutrients for diabetes.

DETAILED DESCRIPTION OF THE INVENTION

Figure 1:
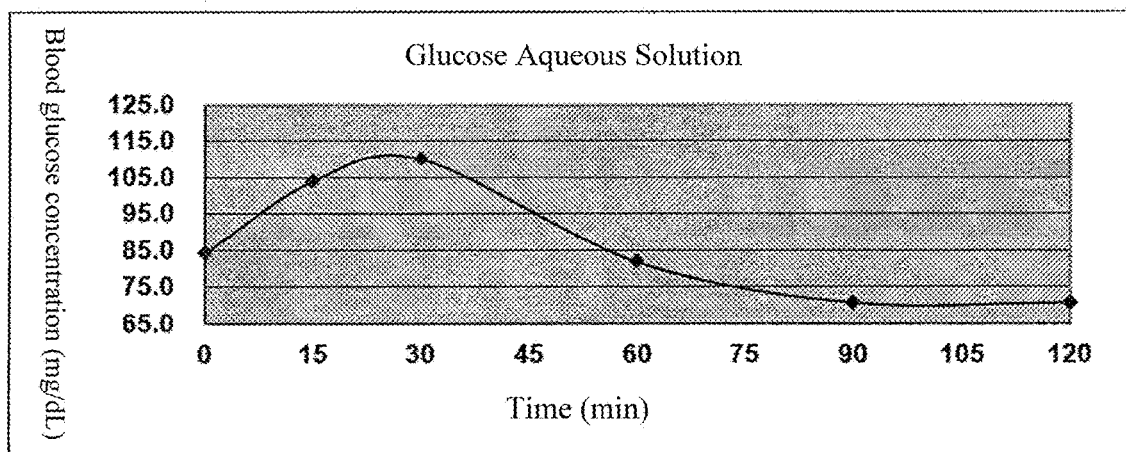
FIG. 1 relates to the blood glucose change after the subjects ingested a glucose aqueous solution containing 25 g glucose, wherein 0 minutes represents fasting, and 15, 30, 60, 90 and 120 minutes respectively represent 15, 30, 60, 90 and 120 minutes after ingestion of the glucose aqueous solution.

The present invention utilizes an enzymatic degradation method comprising using lactase and transglucosidase to treat milk raw materials to produce a milk product enriched with oligosaccharides. The enzymatic degradation method of the present invention can simultaneously reduce lactose and glucose contents in a milk product.

Any milk raw materials are suitable in the present invention, including but not limited to cow milk, goat milk and sheep milk, preferably cow milk. The milk raw material may be fresh milk or modified milk.

In one embodiment, the milk raw material comprises a solid content of about 10 to 60% (w/w), preferably about 30 to 50% (w/w), more preferably about 40% (w/w).

Lactase suitable in the method of the present invention may be of any origin, including but not limited to lactase from *Aspergillus*, *Saccharomyces* and *Kluyveromyces*, preferably from *Kluyveromyces*.

In one embodiment, the amount of lactase to be added is, based on the weight of lactose of the milk raw material, about 0.01 to 0.5% (w/w), preferably about 0.05 to 0.2% (w/w), more preferably about 0.1% (w/w).

Transglucosidase suitable in the method of the present invention may be of any origin, including but not limited to transglucosidase from *Aspergillus* and *Acremonium*, preferably from *Aspergillus*, such as *Aspergillus niger*.

In one embodiment, the amount of transglucosidase to be added is, based on the weight of lactose of the milk raw material, about 0.01 to 1.0% (w/w), preferably about 0.02 to 0.6% (w/w), more preferably about 0.05 to 0.3% (w/w).

In one embodiment, the milk raw material reacts with lactase and transglucosidase at a temperature of about 40 to 60° C., preferably about 45 to 55° C., more preferably about 50° C.

According to the present invention, the milk raw material reacts with lactase and transglucosidase for a suitable period of time so that a milk product enriched with oligosaccharides including galactooligosaccharide and isomalto-oligosaccharide is produced. In one embodiment, the milk raw material reacts with lactase and transglucosidase for about 30 to 90 minutes, preferably about 40 to 80 minutes, more preferably about 50 to 70 minutes, most preferably about 60 minutes.

In one embodiment, the milk product produced by the method of the present invention is further enriched with lactoprotein solid. In one embodiment, the amount of lactoprotein solid contained in the milk product produced by the method of the present invention is about 10 to 18% (w/w), preferably about 12 to 16% (w/w), more preferably about 14% (w/w).

The milk product produced by the method of the present invention is enriched with oligosaccharides. In one embodiment, the amount of galactooligosaccharide contained in the milk product produced by the method of the present invention is about 1.0 (g/100 g) or more, for example, about 1.0 to 7.0 (g/100 g); preferably about 3.0 (g/100 g) or more, for example, about 3.0 to 7.0 (g/100 g); more preferably about 5.0 (g/100 g) or more, for example, about 5.0 to 7.0 (g/100 g). In one embodiment, the amount of isomalto-oligosaccharide contained in the milk product produced by the method of the present invention is about 0.5 (g/100 g) or more, for example, about 0.5 to 4.0 (g/100 g); preferably about 2.0 (g/100 g) or more, for example, 2.0 to 4.0 (g/100 g); more preferably about 3.0 (g/100 g) or more, for example, 3.0 to 4.0 (g/100 g).

In one embodiment, the method of the present invention comprises the following steps:

(1) providing a milk raw material containing about 10 to 60% (w/w) solid, preferably a milk raw material containing about 30 to 50% (w/w) solid, more preferably a milk raw material containing about 40% (w/w) solid;

(2) adding about 0.01 to 0.5% (preferably about 0.05 to 0.2%, more preferably about 0.1%) (w/w) lactase and about 0.01 to 1.0% (preferably about 0.02 to 0.6%, more preferably about 0.05 to 0.3%) (w/w) transglucosidase to said milk raw material; and (3) reacting at about 40 to 60° C. (preferably about 45 to 55° C., more preferably about 50° C.) for about 30 to 90 minutes (preferably about 40 to 80 minutes, more preferably about 50 to 70 minutes, most preferably about 60 minutes).

The method of the present invention further comprises an enzyme inactivation step. Any known methods for inactivating an enzyme are suitable in the present invention.

In one embodiment, the method of the present invention further comprises step (4): heating liquid milk obtained from step (3) to inactivate enzymes followed by cooling. In one embodiment, the temperature of step (4) for heating and inactivating enzymes is 70 to 80° C., and the temperature is cooled to 10 to 20° C.

The milk product produced according to the method of the present invention can be sterilized by any known sterilizing method and then packaged.

In one embodiment, the method of the present invention further comprises step (5): subjecting the product obtained from step (4) to ultra-high temperature (UHT) pasteurization. In one embodiment, the UHT pasteurization of step (5) is conducted at 140° C. for 30 seconds.

In one embodiment, the milk product of the present invention having undergone the sterilization process of step (5) is further packaged by aseptic cold filling technology.

In one embodiment, the milk raw material is cow milk containing 40% of solid. After addition of 0.1% (w/w) lactase and 0.05% (w/w) transglucosidase and reaction at 50° C. for 60 minutes, the obtained milk product contained 14.32% (w/w) lactoprotein solid, 5.64 (g/100 g) galactooligosaccharide and 2.2 (g/100 g) isomalto-oligosaccharide.

In one embodiment, the milk raw material is cow milk containing 40% of solid. After addition of 0.1% (w/w) lactase and 0.1% (w/w) transglucosidase and reaction at 50° C. for 60 minutes, the obtained milk product contained 14.13% (w/w) lactoprotein solid, 5.77 (g/100 g) galactooligosaccharide and 2.41 (g/100 g) isomalto-oligosaccharide.

In one embodiment, the milk raw material is cow milk containing 40% of solid. After addition of 0.1% (w/w) lactase and 0.2% (w/w) transglucosidase and reaction at 50° C. for 60 minutes, the obtained milk product contained 14.50% (w/w) lactoprotein solid, 6.10 (g/100 g) galactooligosaccharide and 2.38 (g/100 g) isomalto-oligosaccharide.

In one embodiment, the milk raw material is cow milk containing 40% of solid. After addition of 0.1% (w/w) lactase and 0.3% (w/w) transglucosidase and reaction at 50° C. for 60 minutes, the obtained milk product contained 14.08% (w/w) lactoprotein solid, 6.76 (g/100 g) galactooligosaccharide and 3.16 (g/100 g) isomalto-oligosaccharide.

Experiments prove that by drinking the milk product of the present invention enriched with oligosaccharides, the levels of triglycerides, total cholesterol in the blood, and low-density lipoprotein cholesterol can be effectively decreased, and the level of high-density lipoprotein cholesterol can be effectively increased.

Accordingly, the present invention provides a use of the milk product of the present invention enriched with oligosaccharides for modulating blood lipids, preferably for reducing blood triglyceride level, reducing the level of total cholesterol in blood, reducing the level of low-density lipoprotein cholesterol in blood, and/or increasing the level of high-density lipoprotein cholesterol in blood.

Further, experiments prove that by drinking the milk product of the present invention enriched with oligosaccharides, probiotics such as *Lactobacillus* spp. and *Bifidobacterium* spp. in the intestinal tract can be increased and harmful bacteria such as *Clostridium perfringens* can be reduced, which can help improve the intestinal bacterial flora.

Accordingly, the present invention provides a use of the milk product of the present invention enriched with oligosaccharides for improving intestinal function, including increasing intestinal probiotics, reducing intestinal harmful bacteria, and/or improving the intestinal bacterial flora.

Furthermore, experiments prove that by drinking the milk product of the present invention enriched with oligosaccharides, immunity can be improved.

Accordingly, the present invention also provides a use of the milk product of the present invention enriched with oligosaccharides for improving immunity.

According to the GI values of various foods as measured by Brand-Miller et al (2003, 2008), by using glucose as reference food, the food with a GI value less than 55 is a low GI food, the food with a GI value between 55 and 69 is a medium GI food, and the food with a GI value greater than 70 is a high GI food. Experiments prove that the milk product of the present invention enriched with oligosaccharides has a GI value of less than 55, and thus is a low GI food.

The milk product of the present invention enriched with oligosaccharides, the process of producing the same and use thereof in the present invention are further illustrated in the following non-limitative examples. These examples should not be deemed as overly limiting the present invention. Persons of ordinary skill in the art can modify or change the examples described below without deviating from the spirit or scope of the present invention.

EXAMPLES

The following examples are provided only for the purpose of further describing the present invention and are not intended for limiting the scope of the present invention.

Example 1

According to the content of lactose, whole milk (solid content of 12%, w/w) (CNS3056) was added with 0.1% lactase from *Kluyveromyces* followed by reaction at 50° C. for 0 to 2 hours. The obtained milk product contained a lactoprotein content of 3.06, 3.07, 3.03, 3.08% (w/w) and a galactooligosaccharide content of 0, 0.14, 0.61, 0.35 (g/100 g) at 0, 30, 60, 120 minutes, respectively.

Example 2

According to the content of lactose, whole milk (solid content of 40%, w/w) (CNS3056) was added with 0.1% lactase from *Kluyveromyces* followed by reaction at 50° C. for 0 to 2 hours. The obtained milk product contained a lactoprotein content of 14.22, 14.12, 14.01, 14.15% (w/w) and a galactooligosaccharide content of 0, 1.5, 5.46, 3.75 (g/100 g) at 0, 30, 60, 120 minutes, respectively.

The reaction conditions and galactooligosaccharide content of Examples 1 and 2 are shown in the table below:

TABLE 1

| | Galactooligosaccharide content produced at different reaction times | | | | | |
|---|---|---|---|---|---|---|
| Example | milk solid content (%, w/w) | source of enzyme (reaction temperature) | reaction time (minutes) | lactoprotein content (%) | milk product after enzyme treatment GOS content (g/100 g) | final liquid milk product (milk solid content 12%) GOS content (g/100 g) |
| Example 1 | 12 | *Kluyveromyces* (50° C.) | 0 | 3.06 | 0 | 0 |
| | | | 30 | 3.07 | 0.14 | 0.14 |
| | | | 60 | 3.03 | 0.61 | 0.61 |
| | | | 120 | 3.08 | 0.35 | 0.35 |
| Example 2 | 40 | *Kluyveromyces* (50° C.) | 0 | 14.22 | 0 | 0 |
| | | | 30 | 14.12 | 1.5 | 0.45 |
| | | | 60 | 14.01 | 5.46 | 1.64 |
| | | | 120 | 14.15 | 3.75 | 1.13 |

Example 3

Milk powder was homogeneously dissolved in 55° C. water to form a high concentration milk (solid content of 40%, w/w), then added with 0.1% lactase from *Kluyveromyces* followed by reaction at 50° C. for 60 minutes. The milk product obtained at 60 minutes contained a lactoprotein content of 14.15% (w/w), a galactooligosaccharide content of 5.16 (g/100 g) and an isomalto-oligosaccharide content of 0 (g/100 g).

Example 4

Milk powder was homogeneously dissolved in 55° C. water to form a high concentration milk (solid content of 40%, w/w), then added with 0.1% lactase from *Kluyveromyces* and 0.05% transglucosidase from *Aspergillus* followed by reaction at 50° C. for 60 minutes. The milk product obtained at 60 minutes contained a lactoprotein content of 14.32% (w/w), a galactooligosaccharide content of 5.64 (g/100 g) and an isomalto-oligosaccharide content of 2.22 (g/100 g).

Example 5

Milk powder was homogeneously dissolved in 55° C. water to form a high concentration milk (solid content of 40%, w/w), then added with 0.1% lactase from *Kluyveromyces* and 0.1% transglucosidase from *Aspergillus* followed by reaction at 50° C. for 60 minutes. The milk product obtained at 60 minutes contained a lactoprotein content of 14.13% (w/w), a galactooligosaccharide content of 5.77 (g/100 g) and an isomalto-oligosaccharide content of 2.41 (g/100 g).

Example 6

Milk powder was homogeneously dissolved in 55° C. water to form a high concentration milk (solid content of 40%, w/w), then added with 0.1% lactase from *Kluyveromyces* and 0.2% transglucosidase from *Aspergillus* followed by reaction at 50° C. for 60 minutes. The milk product obtained at 60 minutes contained a lactoprotein content of 14.50% (w/w), a galactooligosaccharide content of 6.1 (g/100 g) and an isomalto-oligosaccharide content of 2.38 (g/100 g).

Example 7

Milk powder was homogeneously dissolved in 55° C. water to form a high concentration milk (solid content of 40%, w/w), then added with 0.1% lactase from *Kluyveromyces* and 0.3% transglucosidase from *Aspergillus* followed by reaction at 50° C. for 60 minutes. The milk product obtained at 60 minutes contained a lactoprotein content of 14.08% (w/w), a galactooligosaccharide content of 6.76 (g/100 g) and an isomalto-oligosaccharide content of 3.16 (g/100 g).

The reaction conditions and the contents of lactoprotein, galactooligosaccharide and isomalto-oligosaccharide are shown in the table below:

experimental group drank the oligosaccharide milk product of the present invention, and the 12 subjects in the control group drank a milk product not belonging to the present

TABLE 2

Oligosaccharide content produced from different concentrations of transglucosidase added

| Example | milk solid content (% w/w) | source of enzyme (reaction temperature) amount (%) | | reaction time (minutes) | lactoprotein content (%) | milk product after enzyme treatment | | final liquid milk product (milk solid content 12%) GOS/IMO (g/100 g) |
|---|---|---|---|---|---|---|---|---|
| | | | | | | GOS content (g/100 g) | IMO content (g/100 g) | |
| Example 3 | 40 | Kluyveromyces (50° C.) 0.1 | Aspergillus (50° C.) 0 | 60 | 14.15 | 5.16 | 0 | 1.55/0 |
| Example 4 | | | Aspergillus (50° C.) 0.05 | 60 | 14.32 | 5.64 | 2.22 | 1.69/0.67 |
| Example 5 | | | Aspergillus (50° C.) 0.1 | 60 | 14.13 | 5.77 | 2.41 | 1.73/0.72 |
| Example 6 | | | Aspergillus (50° C.) 0.2 | 60 | 14.50 | 6.10 | 2.38 | 1.83/0.71 |
| Example 7 | | | Aspergillus (50° C.) 0.3 | 60 | 14.08 | 6.76 | 3.16 | 2.03/0.95 |

Liquid milk obtained from Examples 3 to 7 was subjected to heating and enzyme inactivation (70 to 80° C.) followed by cooling to 10 to 20° C. The resulting product was then subjected to UHT pasteurization (140° C. for 30 seconds), followed by packaging using aseptic cold filling technology.

Example 8: Evaluation of the Function of Blood Lipid Modulation

The experiment is primarily focused on the effect of the oligosaccharide milk product of the present invention on the blood lipids of adults. The experiment is a single-blind parallel experiment. 24 subjects aged 22 to 64 were recruited, excluding those having any major diseases (such as liver, kidney, gastrointestinal, cardiovascular diseases or mental illness) or taking any blood lipid-lowering drugs or supplements. The subjects were randomly assigned to the experimental group or control group. The 12 subjects in the experimental group drank the oligosaccharide milk product of the present invention, and the 12 subjects in the control group drank a milk product not belonging to the present invention. Each subject drank a bottle of the oligosaccharide milk product of the present invention (or the milk product not belonging to the present invention) at breakfast and after lunch, (270 ml per bottle, two bottles (540 ml in total) per day) for 8 weeks followed by a two-week emptying phase. Blood from the subjects was collected at weeks 0, 4, 8 and 10 of the experiment and the diet of the subjects was recorded for three days to ensure that the diet was not changed during experimentation. No blood lipid-lowering drugs or supplements were taken during experimentation.

Levels of triglyceride (TG), total cholesterol (TC), low-density lipoprotein cholesterol (LDL-C) and high-density lipoprotein cholesterol (HDL-C) in the blood of the subjects were measured before commencement of the experiment and at weeks 4, 8 and 10 during the experiment. The results are shown in Table 3 below.

TABLE 3

Blood lipid changes after the subjects ingested the oligosaccharide milk product

| | Control Group (n = 12) | | | | Experimental Group (n = 12) | | | |
|---|---|---|---|---|---|---|---|---|
| | baseline | Week 4 | Week 8 | Week 10 | baseline | Week 4 | Week 8 | Week 10 |
| TG (mg/dL) | 92.1 ± 33.5 | 93.6 ± 32.7 | 90.4 ± 29.0 | 89.3 ± 34.0 | 91.1 ± 47.3 | 88.8 ± 59.3 | 74.4 ± 48.5* | 77.4 ± 40.9 |
| TC (mg/dL) | 216.9 ± 16.9 | 222.3 ± 18.2 | 220.2 ± 21.4 | 211.1 ± 22.7 | 220.8 ± 15.7 | 207.7 ± 20.9* | 200.3 ± 13.0*† | 196.2 ± 17.3* |
| HDL-C (mg/dL) | 59.8 ± 12.6 | 59.7 ± 13.9 | 59.9 ± 14.1 | 60.1 ± 14.0 | 60.9 ± 11.3 | 67.0 ± 11.6* | 66.0 ± 10.2* | 62.3 ± 10.0 |
| LDL-C (mg/dL) | 144.0 ± 21.8 | 146.1 ± 23.1 | 144.6 ± 19.6 | 141.1 ± 24.6 | 141.0 ± 21.8 | 129.0 ± 27.5* | 125.6 ± 15.6*† | 125.3 ± 18.4* |

Experimental data is expressed by mean value ± standard deviation (SD), n = 12
*$p < 0.05$ represents that data in the same group are significantly different from baseline
†$p < 0.05$ represents that data in the same week are significantly different from Control Group The above results demonstrate that by drinking the oligosaccharide milk product of the present invention for 8 weeks, the levels of triglyceride, total cholesterol and low-density lipoprotein cholesterol in the blood can be effectively decreased, and the level of high-density lipoprotein cholesterol can be effectively increased.

Example 9: Evaluation of the Improvement of Gastrointestinal Function

Healthy adult subjects drank 540 ml of the oligosaccharide milk product of the present invention per day for 4 weeks. The bacterial numbers of Coliform organisms, *Lactobacillus* spp., *Bifidobacterium* spp., and *Clostridium perfringens* in the feces samples of the subjects were measured at weeks 0, 2, 4 and 5. The results are shown in Table 4.

TABLE 4

Changes of intestinal flora after the subjects ingested the oligosaccharide milk product

| | Week | | | |
|---|---|---|---|---|
| | 0 | 2 | 4 | 5 |
| | Log 10 CFU/g (feces weight) | | | |
| Total anaerobes | 11.20 ± 0.62 | 11.49 ± 0.35 | 11.06 ± 0.49 | 11.32 ± 0.92 |
| Coliform organisms | 7.43 ± 0.45 | 7.81 ± 0.61 | 7.33 ± 1.10 | 7.04 ± 0.85 |
| *Lactobacillus* spp. | 9.41 ± 0.68 | 10.41 ± 0.57* | 10.58 ± 0.64* | 10.53 ± 0.81* |
| *Bifidobacterium* spp. | 9.67 ± 0.64 | 10.74 ± 0.35* | 10.53 ± 0.76* | 10.88 ± 0.63* |
| *Clostridium perfringens* | 5.79 ± 0.81 | 4.21 ± 0.38* | 4.71 ± 0.31* | 5.36 ± 0.61 |

Experimental data is expressed by Mean ± SD, n = 8 o
*represents significant difference $P < 0.05$ compared to Week 0

As demonstrated in the table above, the bacterial numbers of both *Bifidobacterium* spp. and *Lactobacillus* spp. are significantly increased ($P<0.05$), the bacterial numbers of *Clostridium perfringens* are significantly decreased ($P<0.05$), and the bacterial numbers of Coliform organisms have no significant change. The results demonstrate that for the healthy adults who ingested 540 ml of the oligosaccharide milk product of the present invention per day, the probiotics in the intestinal tract are increased and the harmful bacteria are decreased. The oligosaccharide milk product of the present invention can improve intestinal bacterial flora and has a health-care effect.

Example 10: Evaluation of Immune Modulatory Function

The experiment mainly studies the immune modulatory efficacy of the oligosaccharide milk product of the present invention. Through evaluating specific immune modulatory function and non-specific immune modulatory function, the animal experiments prove that the product of the present invention is useful in:
1. promoting the ability of immune cells to proliferate;
2. promoting the activity of phagocytes;
3. promoting the activity of nature killer cells;
4. modulating cytokine secretion; and
5. elevating antibody levels in the serum.

Tables 5 and 6 demonstrate the experimental results on the modulation of specific and non-specific immune functions.

TABLE 5

Summary of the experimental results of the modulation of specific immune functions

| Measured Items | | Low dose | Medium dose | High dose |
|---|---|---|---|---|
| Ability of immune cells to proliferate | Con A | — | $P < 0.05\uparrow$ | $P < 0.05\uparrow$ |
| | LPS | — | $P < 0.05\uparrow$ | $P < 0.05\uparrow$ |
| | OVA | $P < 0.05\uparrow$ | $P < 0.05\uparrow$ | $P < 0.05\uparrow$ |

TABLE 5-continued

Summary of the experimental results of the modulation of specific immune functions

| Measured Items | | Low dose | Medium dose | High dose |
|---|---|---|---|---|
| Function of cytokine secretion | IL-2 Con A | $P < 0.05\uparrow$ | $P < 0.05\uparrow$ | $P < 0.05\uparrow$ |
| | LPS | — | — | — |
| | OVA | $P < 0.05\uparrow$ | $P < 0.05\uparrow$ | $P < 0.05\uparrow$ |

TABLE 5-continued

Summary of the experimental results of the modulation of specific immune functions

| Measured Items | | | Low dose | Medium dose | High dose |
|---|---|---|---|---|---|
| | IL-4 | Con A | — | — | — |
| | | LPS | — | — | — |
| | | OVA | — | — | $P < 0.05\downarrow$ |
| | IL-5 | Con A | $P < 0.05\downarrow$ | — | $P < 0.05\downarrow$ |
| | | LPS | — | — | — |
| | | OVA | $P < 0.05\downarrow$ | $P < 0.05\downarrow$ | $P < 0.05\downarrow$ |
| | TNF- | Con A | $P < 0.05\downarrow$ | $P < 0.05\downarrow$ | $P < 0.05\downarrow$ |
| | | LPS | $P < 0.05\downarrow$ | $P < 0.05\downarrow$ | $P < 0.05\downarrow$ |
| | | OVA | — | — | $P < 0.05\downarrow$ |
| | IFN- | Con A | $P < 0.05\uparrow$ | $P < 0.05\uparrow$ | $P < 0.05\uparrow$ |
| | | LPS | — | — | — |
| | | OVA | — | — | — |
| Lymphocytes subpopulation analysis | T4 cell | | — | — | — |
| | T8 cell | | — | — | — |
| | T cell | | — | — | — |
| | B cell | | — | — | — |
| | NK cell | | — | — | — |
| Serum antibody production | anti-OVA-IgG1 | | — | $P < 0.05\downarrow$ | — |
| | anti-OVA-Ig2a | | $P < 0.05\uparrow$ | $P < 0.05\uparrow$ | $P < 0.05\uparrow$ |
| | anti-OVA-IgE | | $P < 0.05\downarrow$ | $P < 0.05\downarrow$ | $P < 0.05\downarrow$ |

— represents no significant difference compared to the negative control group
$P < 0.05\uparrow$ represents significant increase compared to the negative control group
$P < 0.05\downarrow$ represents significant decrease compared to the negative control group

TABLE 6

Summary of the experimental results of the modulation of non-specific immune functions

| | | Group | | |
|---|---|---|---|---|
| Measured Items | | Low dose | Medium dose | High dose |
| Ability of immune cells to proliferate | Con A | $P < 0.05\uparrow$ | $P < 0.05\uparrow$ | $P < 0.05\uparrow$ |
| | LPS | $P < 0.05\uparrow$ | $P < 0.05\uparrow$ | $P < 0.05\uparrow$ |

TABLE 6-continued

Summary of the experimental results of the modulation of non-specific immune functions

| Measured Items | | | Group | | |
|---|---|---|---|---|---|
| | | | Low dose | Medium dose | High dose |
| Function of cytokine secretion | IL-2 | Con A | P < 0.05↑ | P < 0.05↑ | P < 0.05↑ |
| | | LPS | — | — | P < 0.05↑ |
| | IL-4 | Con A | — | — | — |
| | | LPS | P < 0.05↓ | P < 0.05↓ | P < 0.05↓ |
| | IL-5 | Con A | P < 0.05↓ | P < 0.05↓ | P < 0.05↓ |
| | | LPS | — | — | — |
| | TNF- | Con A | P < 0.05↓ | P < 0.05↓ | P < 0.05↓ |
| | | LPS | P < 0.05↓ | P < 0.05↓ | P < 0.05↓ |
| | IFN- | Con A | — | P < 0.05↑ | P < 0.05↑ |
| | | LPS | — | — | — |
| Lymphocytes subpopulation analysis | T4 cell | | — | — | — |
| | T8 cell | | — | — | — |
| | T cell | | — | — | — |
| | B cell | | — | — | — |
| | NK cell | | — | — | — |
| Serum antibody production | IgG | | — | P < 0.05↑ | P < 0.05↑ |
| | IgM | | — | P < 0.05↑ | P < 0.05↑ |
| | IgA | | P < 0.05↑ | P < 0.05↑ | P < 0.05↑ |
| | IgE | | — | — | — |
| Activity of NK cells | E/T ratio = 5:1 | | P < 0.05↑ | P < 0.05↑ | P < 0.05↑ |
| | E/T ratio = 10:1 | | — | P < 0.05↑ | P < 0.05↑ |
| | E/T ratio = 25:1 | | P < 0.05↑ | P < 0.05↑ | P < 0.05↑ |
| Activity of phagocytes in abdominal cavity | M.O.I. = 12.5 | | — | P < 0.05↑ | P < 0.05↑ |
| | M.O.I. = 25 | | — | P < 0.05↑ | P < 0.05↑ |
| | M.O.I. = 50 | | P < 0.05↑ | P < 0.05↑ | P < 0.05↑ |

— represents no significant difference from negative control group
P < 0.05↑ represents significant increase over negative control group
P < 0.05↓ represents significant decrease over negative control group The above experimental results demonstrate that the oligosaccharide milk product of the present invention has an efficacy in modulating immune functions.

Example 11: Evaluation of GI

A free-living and self-diet control design was utilized for the experiment. Each subject enrolled in the GI test participated in two tests, including one standard food test (glucose aqueous solution) and one experimental food test (the oligosaccharide milk product of the present invention). The subjects were starved for 10 to 12 hours at night before testing. On the morning of testing, the subjects were first examined for body status, and then their fasting blood was collected by a nurse. Then, the subjects were given an experimental food containing 25 g saccharides. Venous blood was collected at 15, 30, 60, 90 and 120 minutes after ingestion. Each time about 3 ml blood was collected.

At fasting and after ingestion of the standard experimental food, i.e., the glucose aqueous solution, the average blood glucose levels at fasting, 15 minutes, 30 minutes, 60 minutes, 90 minutes and 120 minutes were 84.2±4.5, 104.0±10.4, 110.0±11.7, 81.8±18.5, 70.7±14.2 and 70.7±7.5 mg/dL, respectively; and the area under the curve (AUC) of total blood glucose was 846.6. When using glucose aqueous solution as the standard test food, the GI value was 100. The values and diagram of blood glucose change are shown in Table 7 and FIG. 1, respectively.

TABLE 7

Blood glucose change and AUC[1,2] after the subjects ingested a glucose aqueous solution containing 25 g glucose

| Time (minutes) | 0 | 15 | 30 | 60 | 90 | 120 |
|---|---|---|---|---|---|---|
| Blood glucose (mg/dL) | 84.2 ± 4.5 | 104.0 ± 10.4 | 110.0 ± 11.7 | 81.8 ± 18.5 | 70.7 ± 14.2 | 70.7 ± 7.5 |
| AUC | | 148.8 | 342.9 | 354.9 | Total: 846.6 | |
| GI value | | | | 100 | | |

Figure 2:
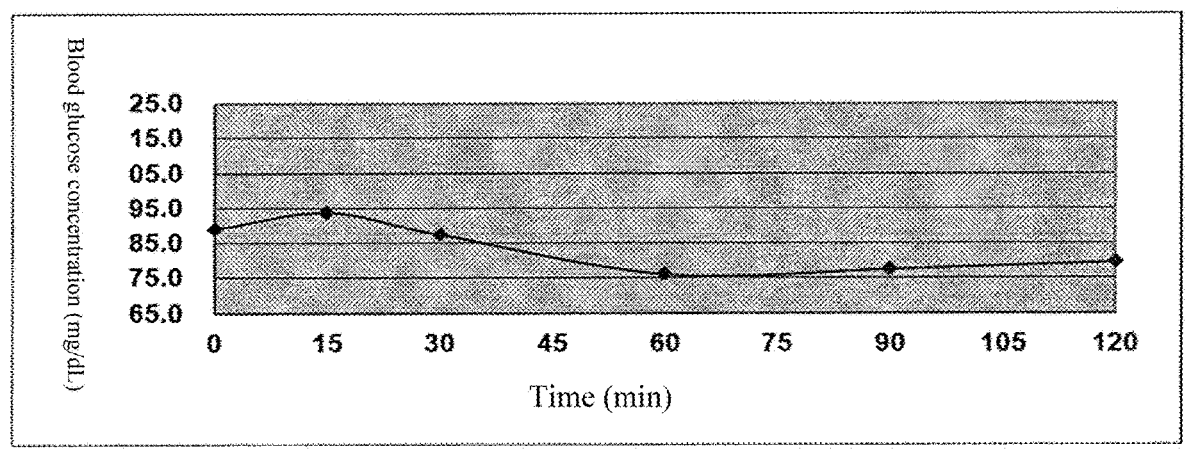
FIG. 2 relates to the blood glucose change after the subjects ingested an oligosaccharide milk product (containing 25 g saccharides) of the present invention, wherein 0 minutes represents fasting, and 15, 30, 60, 90 and 120 minutes respectively represent 15, 30, 60, 90 and 120 minutes after drinking the milk product of the present invention.

[1] all values are expressed by Mean ± SD
[2] 0 minutes representing fasting, and 15, 30, 60, 90 and 120 minutes respectively representing 15, 30, 60, 90 and 120 minutes after ingestion of glucose aqueous solution At fasting and after ingestion of the oligosaccharide milk product (containing 25 g oligosaccharides) of the present invention, the average blood glucose levels at fasting, 15 minutes, 30 minutes, 60 minutes, 90 minutes and 120 minutes were 89.1±5.8, 93.9±5.2, 87.4±10.1, 76.0±9.0, 77.4±7.2 and 79.5±6.2 mg/dL, respectively; and the area under the curve (AUC) of total blood glucose was 62.9. By using glucose aqueous solution as the standard for comparison, the GI value was 7.4. The values and diagram of blood glucose change are shown in Table 8 and FIG. 2, respectively.

TABLE 8

Blood glucose change and AUC[1,2] after the subject ingested the oligosaccharide milk product (containing 25 g oligosaccharides) of the present invention

| Time (minutes) | 0 | 15 | 30 | 60 | 90 | 120 |
|---|---|---|---|---|---|---|
| Blood glucose (mg/dL) | 89.1 ± 5.8 | 93.9 ± 5.2 | 87.4 ± 10.1 | 76.0 ± 9.0 | 77.4 ± 7.2 | 79.5 ± 6.2 |
| AUC | 36.2 | 26.7 | | | Total: 62.9 | |
| GI value | | | 7.4 | | | |

[1] all values are expressed by Mean ± SD
[2] 0 minutes representing fasting, and 15, 30, 60, 90 and 120 minutes respectively representing 15, 30, 60, 90 and 120 minutes after drinking the test samples From the above experiments, it is known that the GI value of the oligosaccharide milk product of the present invention is 7.4, so the product is a low GI food.

What is claimed is:

1. A process for the production of a milk product enriched with galactooligosaccharide and isomalto-oligosaccharide and having reduced lactose and glucose contents, comprising treating milk raw materials with lactase and transglucosidase, comprising the following steps:
   (1) providing the milk raw materials, wherein the milk raw materials comprise about 10 to 60% (w/w) solid;
   (2) adding about 0.01 to 0.5% (w/w) lactase and about 0.01 to 1.0% (w/w) transglucosidase to the milk raw materials;
   (3) reacting at about 50° C. for about 60 minutes, and
   (4) subjecting the product of step (3) to heating and enzyme inactivation followed by cooling,
   wherein after treatment, the content of galactooligosaccharide is about 1.0 (g/100 g) or more and the content of isomalto-oligosaccharide is about 0.5 (g/100 g) or more.

2. The process according to claim 1, wherein the milk raw materials are cow milk, goat milk or sheep milk.

3. The process according to claim 2, wherein the milk raw materials are cow milk.

4. The process according to claim 1, wherein the lactase is from *Kluyveromyces* and the transglucosidase is from *Aspergillus*.

5. The process according to claim 1, further comprising:
   step (5): subjecting the product of step (4) to ultra-high temperature (UHT) pasteurization.

6. The process according to claim 5, further comprising packaging the milk product obtained from step (5) with aseptic cold filling technology.

* * * * *